United States Patent [19]

Osanai

[11] 4,206,982
[45] Jun. 10, 1980

[54] CAMERA

[75] Inventor: Akira Osanai, Hachioji, Japan

[73] Assignee: Olympus Optical Company Limited, Tokyo, Japan

[21] Appl. No.: 942,404

[22] Filed: Sep. 14, 1978

[30] Foreign Application Priority Data

Sep. 16, 1977 [JP] Japan .................. 52-111400
Sep. 16, 1977 [JP] Japan .................. 52-124696[U]
Sep. 29, 1977 [JP] Japan .................. 52-117012
Sep. 29, 1977 [JP] Japan .................. 52-117013
Sep. 29, 1977 [JP] Japan .................. 52-117014
Sep. 29, 1977 [JP] Japan .................. 52-130832[U]

[51] Int. Cl.$^2$ ............................ G03B 3/00
[52] U.S. Cl. .................. 352/140; 352/174; 352/243
[58] Field of Search ........... 352/140, 174, 91 C, 352/243

[56] References Cited

U.S. PATENT DOCUMENTS

| 3,504,965 | 4/1970 | Lustig | 352/140 |
| 3,784,765 | 1/1974 | Daly | 200/16 D |

Primary Examiner—Monroe H. Hayes
Attorney, Agent, or Firm—J. David Dainow

[57] ABSTRACT

A camera having a zoom function includes a camera body, a lens system, a grip for supporting the camera by hand, a photo-operation button which is manually depressible, a photo-operation member which is displaceable by the photo-operation button in a linear direction for operating the camera and is further displaceable in a second direction approximately perpendicular to the first displacement for zoom-up or zoom-down operation, and an additional operation member for varying the zooming speed in response to the amount of displacement of the photo-operation member.

13 Claims, 19 Drawing Figures

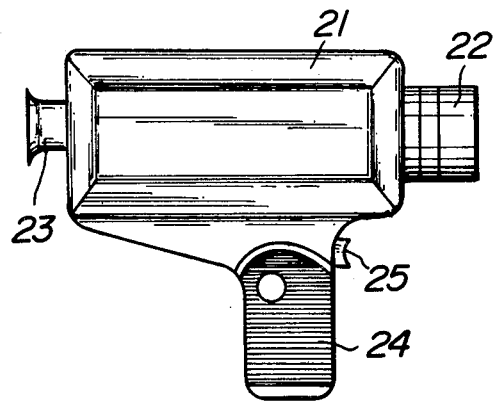
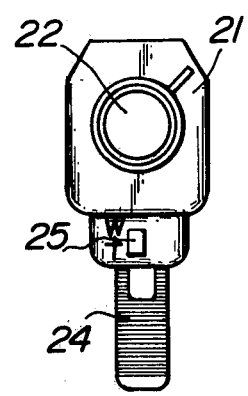
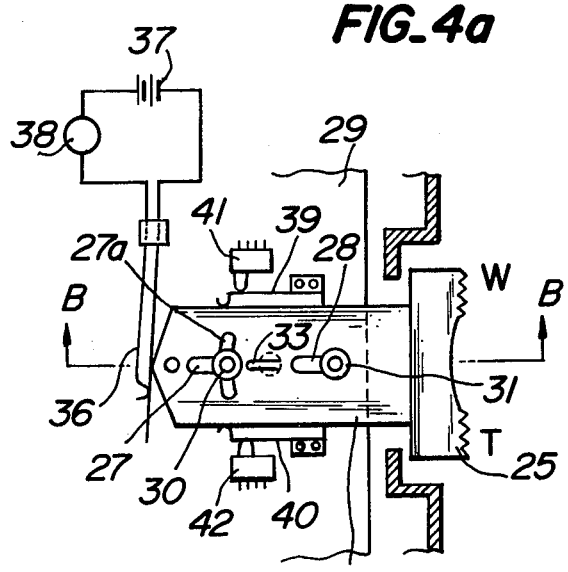
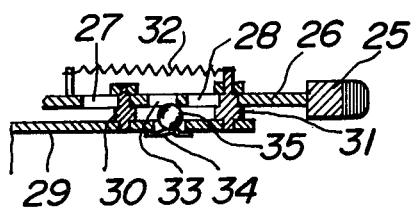

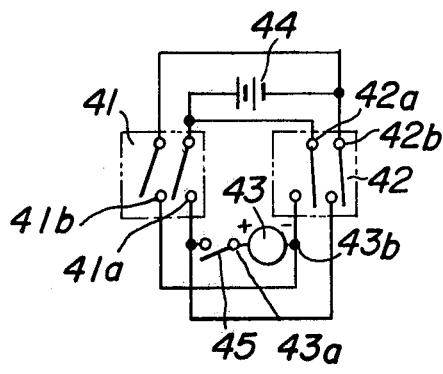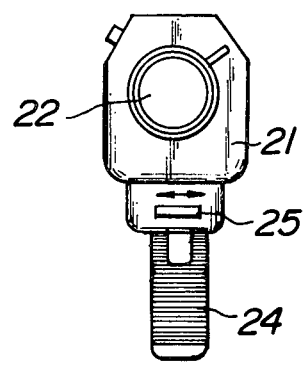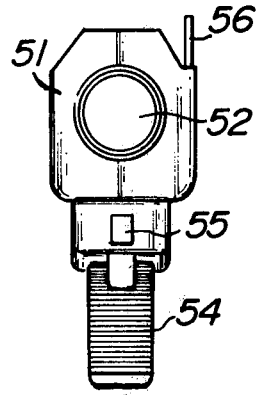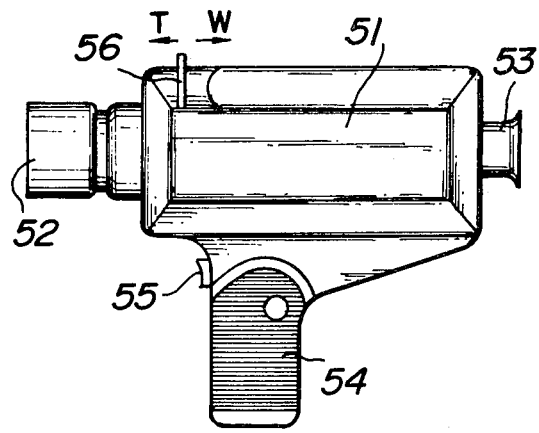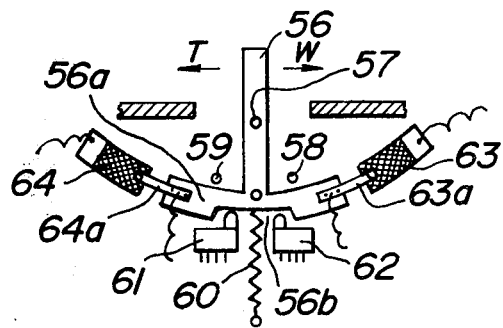

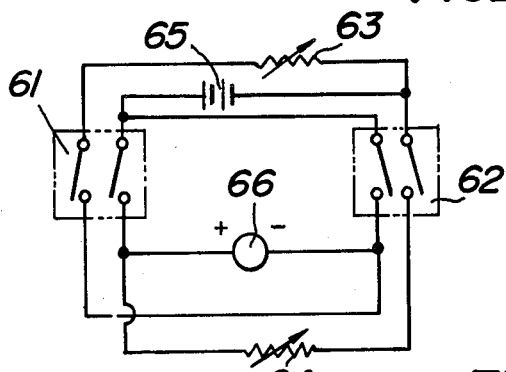
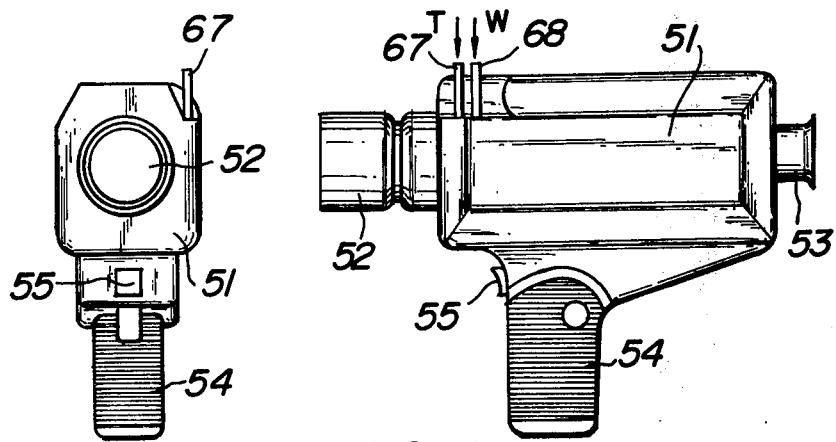
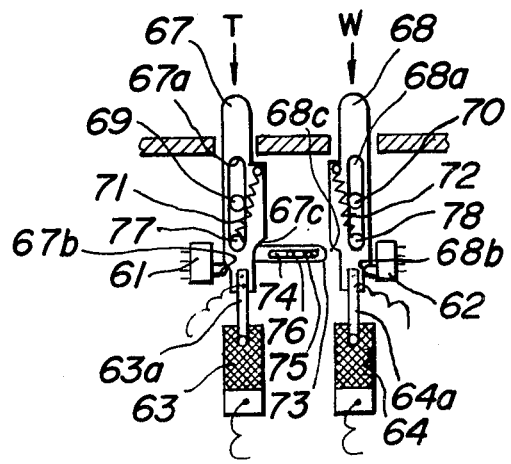

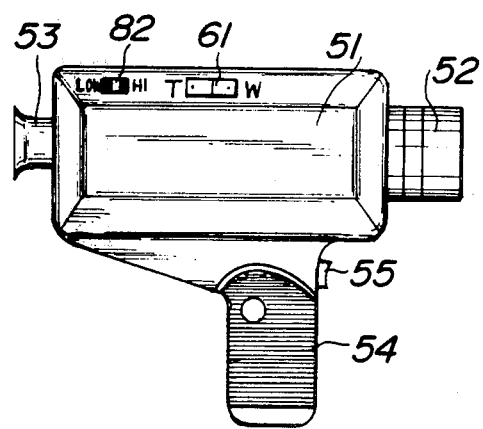
FIG._12a
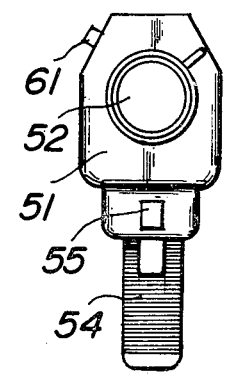
FIG._12b
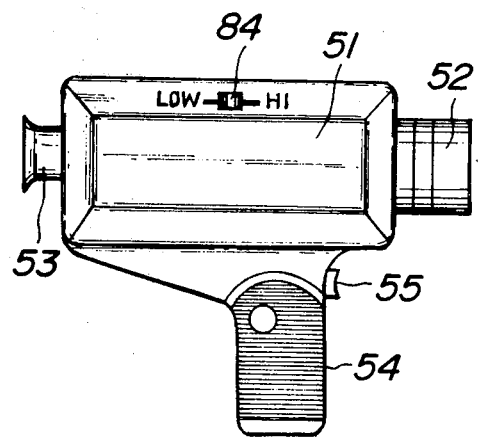
FIG._13a
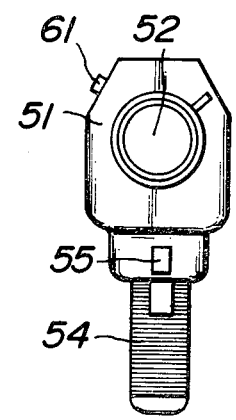
FIG._13b

CAMERA

BACKGROUND OF THE INVENTION

The present invention relates to a camera having a zooming function.

Hitherto, as an example of an 8 mm camera with a power zoom, there are those constructions shown in FIGS. 1a and 1b. In FIGS. 1a and 1b, numeral 1 is a camera body, in front of this body 1 is provided a photo lens 2 and in the rear thereof is provided a finder ocular portion 3. This camera body 1 is provided with a grip 4 gripped by hand when photographing, and near this grip 4 is provided a photo-operation button 5 operated by the hand which holds the grip 4. This photo-operation button 5, as shown in FIG. 2, is movable in a chassis 6 against a spring 7 in said body 1 whereby, a part of the button 5 closes a contact 8 which energizes a photo-motor 10 by means of a D.C. supply source 9 through this contact 8. On the upper portion of one side surface of the body 1 is provided a zoom operation button 11 which controls an electric power zoom function. This operation button 11 may be a two directional button which can switch zoom-up to zoom down and vice versa.

In using such a camera, therefore, the grip 4 is usually gripped by the right hand and the photo-operation button 5 is operated, by a finger of the right hand, while the upper part of the camera body 1 is held by the left hand and a zooming photograph, that is, the zoom-up or zoom-down is taken by operating the zoom operation button 11 with a finger of the left hand.

In such a camera, however, the operation by both hands is a general rule, so that if only a single hand is available to be used, a photograph can be taken but a valuable zoom effect cannot be used and it is very inconvenient. Even if both hands can be used, when a zoom effect is suddenly required in photographing, the zoom operation button 11 has to be found by the left hand, and this is also inconvenient in handling. Also in such a camera, a photo operation button 5 and a zoom operation button 11 are separately provided and each of them are independently operated, so that if the zooming operation is carelessly made while not actually photographing, battery power is unnecessarily consumed.

In order to eliminate such disadvantages, a lock function has been provided in each operation button 5, 11, or alternatively a lock function is provided in the photo operation button 5 only, with provision of an ON-OFF switch in a zoom motor circuit responsive to the zoom operation button 11 interlocked with the operation button 5. With this arrangement, however, the operation becomes troublesome and a number of parts are increased and reliability is deteriorated. Further, such a camera only switches zoom-up or zoom down by means of a zoom operation button and cannot control a zooming speed continuously.

Recently, there has been invented a mechanism such that a switch 82 for switching a speed of the zooming motor from a high speed to a low speed is provided together with the zoom operation button 11 as shown in FIG. 12a, but this is not suitable for switching operation during the zooming photographing with the use of both hands as described above, and as a result almost no photographing speed change effect can be expected.

SUMMARY OF THE INVENTION

An object of the present invention is to eliminate the above described disadvantages.

Another object of the present invention is to provide a camera with a zoom operation mechanism in a photo-operation button, thereby simultaneously performing the photo-operation and the zoom operation by a single hand, and obtaining excellent maneuverability.

A further object of the present invention is to provide a camera in which a function for controlling a zooming speed is added to the zoom operation lever, so that the zooming speed can be controlled during zooming photographing; in addition thereto, the zooming speed is made to correspond approximately in accordance with the amount of displacement of the operation lever, and accordingly the zooming effect is more stabilized.

An even further object of the present invention is to provide a camera in which a zoom operation mechanism is added to a photo-operation button; unnecessary zooming operation may be prevented by making the zooming operation possible only on the precondition of displacing the photo-operation button and consequently any unnecessary consumption of a battery can be avoided, the operation of the camera becomes simplified, and excellent reliability is obtained.

According to the present invention a camera having a zoom function comprises a camera body, a lens system provided in front of the body, a finder ocular member provided at the rear of the body, a grip provided under the body for supporting the camera by hand, and a photo-operation button provided near the grip for operating the camera by hand to take a photograph. A photo-operation member moved by the photo-operating button is displacable in the linear direction for operating the camera, and for zoom-up or zoom-down operating, is displaceable in the direction approximately at a right angle to the first displacement after the first displacement operation by one hand. The invention further comprises another operation member for varying the speed of the zoom-up or zoom-down operation in response to an operation movement by the other hand.

A zoom operation function is added to the photography operation member so as to effect zooming operation on the precondition of displacement of the photography operation member.

A zoom operation lever for making zoom-up or zoom-down possible is provided to change a zooming speed in accordance with an amount of displacement of the zoom operation lever.

The camera further comprises means for making a zooming speed at the time of restoring the operation lever approximately same as the zooming speed in accordance with the amount of displacement of the operation lever.

Two operation levers may be used for effecting zoom-up and zoom-down, respectively, with zooming speeds varied in accordance with the amounts of displacement of these operation levers, and the operation of one lever prevents the operation of the other lever.

BRIEF DESCRIPTION OF THE FIGURES

FIG. 1b is a front view of the conventional camera shown in FIG. 1a;

FIG. 3a is a side view showing one embodiment of a camera according to the present invention;

FIG. 3b is a front view of the camera shown in FIG. 3a;

FIG. 4a is a schematic diagram showing a photo-operation button used in the camera according to the present invention;

FIG. 4b is a fragmentary cross-sectional view taken along the lines B—B of FIG. 4a;

FIG. 5 is a circuit diagram showing a control circuit of a zoom motor used in the camera according to the present invention as exemplified in FIGS. 4a and 4b;

FIG. 6 is a front view showing second embodiment of the camera according to the present invention;

FIG. 7a is a front view showing a third embodiment of the camera according to the present invention;

FIG. 7b is a side view of the camera shown in FIG. 7a;

FIG. 8 is a schematic diagram showing a zoom operation lever used in the camera shown in FIG. 7a;

FIG. 9 is a circuit diagram showing a control circuit of a zoom motor used in the camera according to the present invention as exemplified in FIG. 8;

FIG. 10a is a front view showing fourth embodiment of the camera according to the present invention;

FIG. 10b is a side view of the camera shown in FIG. 10a;

FIG. 11 is a schematic diagram showing a zoom operation lever used in the camera according to the present invention as exemplified in FIG. 10b;

FIG. 12a is a side view showing another embodiment of a conventional camera;

FIG. 12b is a front view of the camera shown in FIG. 12a;

FIG. 13a is a side view showing a fifth embodiment of the camera according to the present invention; and FIG. 13b is a front view of the camera shown in FIG. 13a.

DESCRIPTION OF THE PREFERRED EMBODIMENT

Figure 1A:
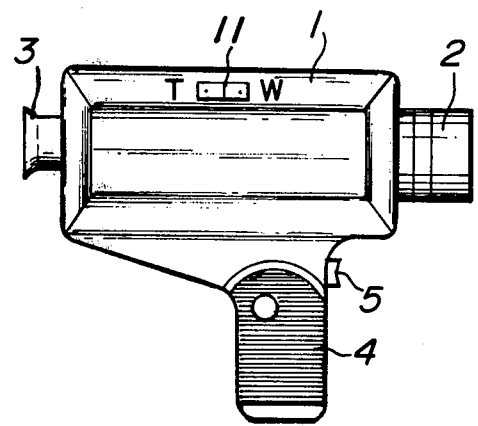
FIG. 1a is a side view showing one embodiment of the conventional camera.
Figure 1B:
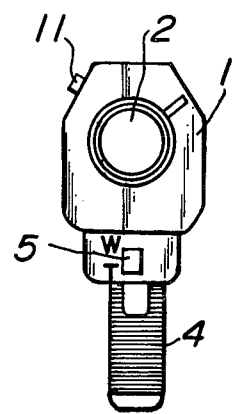
Figure 2:
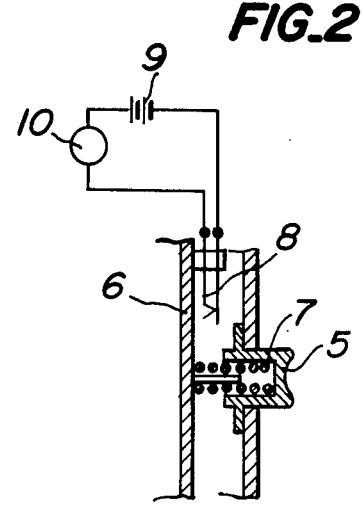
FIG. 2 is a diagram showing an operation button of the camera shown in FIG. 1a and a motor drive circuit.

Referring to FIGS. 3a and 3b a first embodiment of a camera according to the present invention will be described. Reference numeral 21 is a camera body; in front of this body 21 is provided a lens 22 and in the rear thereof is provided a finder ocular portion 23. The camera body 21 is also provided with a grip 24 gripped by hand when manual photographing is required, and near the grip 24 is provided a photo-operation button 25 having a zoom operation function which is operated by the hand which holds the grip 24. In this case, the photo-operation button 25 is constructed as shown in FIGS. 4a and 4b. That is, the operation button 25 is provided with a lever 26. This lever 26 is provided with a pair of elongate holes 27, 28 extending in the axial direction Extending transversely through these elongate holes 27, 28 are pins 30, 31 secured on a chassis 29 so as to make the operation button 25 linearly movable in both directions. In this case, the lever 26 is always biased in the right direction as illustrated by means of a spring 32. (The illustrated embodiment shows the operative button 25 in its position after having been pushed to the left against spring 32). One end of the elongate hole 27 at the left end of the lever 26 is provided with a guide slot 27a extending transversely of the lever 26 and the axis of the elongated holes. Therefore, when the operation button 25 and lever 27 are depressed to the left against spring 32 as shown, the operation button 25 can pivot about pin 31 with its left end moved in the upper and lower directions approximately at a right angle to the axial direction of the lever 26, as the guide slot 27a is guided by the pin 31.

The lever 26 is also provided with a click hole 33 between the elongate holes 27 and 28, so as to engage a click ball or ball detent 35 provided on the chassis 29 through a spring 34 in the click hole 33 and to stabilize the lever 26 in the illustrated state, namely in a neutral or unpivoted state.

An electrical contact 36 is arranged near the end of the lever 26 and is closed from OFF to ON positions when the operation button 25 is pressed to the left as illustrated. This contact 36 or camera switch is connected in series to a D.C. supply source 37 and photo-motor 38 for driving the motor 38 after the closure of the contact 36, this being a first circuit.

Microswitches 41 are provided near both side peripheries of the lever 26 through leaf springs 39, 40. In this case, the leaf springs 39, 40 effect restoring power for urging lever 26 to return to its neutral state when it is moved in the upper and lower directions as illustrated. The microswitch 41 is pressed by the lever 26 through the leaf spring 39 when the operation button 25 is pressed and simultaneously moved in the lower direction (T direction), so as to drive a zoom motor 43 (which will be explained later on) from the wide-angle to telescopic zoom-up direction. When the operation button 25 is pressed and simultaneously moved in the upper direction to a zoom position as illustrated (W direction), the microswitch 42 is pressed by the lever 26 through the leaf spring 40, so as to drive the zoom motor 43 from the telescopic to wide-angle zoom-down direction.

As shown in FIGS. 13a at the upper portion on the side surface of the camera body 1 there is provided a slide-type variable resistor. This variable resistor varies a resistance value by slide operation of a 84, and in the illustrated embodiment, when the knob is slid from the left to the right, a resistance value becomes small.

A second control circuit for the zoom motor is constructed as shown in FIG. 5 with a D.C. supply source 44. A positive terminal of this D.C. source 44 may be connected to a first terminal 43a of the zoom motor 43 through a first contact 41a of the microswitch 41, or connected to the second terminal 43b of said motor 43 through a first contact 42a of the microswitch 42 and a variable resistor 45 corresponding to the slide knob 84; a negative terminal of the D.C. supply source 44 may be connected to the second terminal 43b of the motor 43 through the second contact 41b of the microswitch 41 ad the variable resistor 45 or connected to the first terminal 43a of the motor 43 through the second contact 42b of the microswitch 42 and resistor 45. Accordingly, when the microswitch 41 is actuated, the D.C. source 44 having polarity as illustrated is connected to both ends of the motor 43, the zoom-up operation is carried out. When the microswitch 42 is actuated, the D.C. source 45 has opposite polarity connected to both ends of the motor 43, and the zoom-down operation is carried out. Alternatively, a lock switch (not shown) is used instead of the variable resistor 45 in order to lock the zooming function.

In order to use such a camera, the grip 24 is gripped by the right hand and the upper portion of the body 21 is held and aimed at an object by the left hand. Under this state, when the operation button 25 is pressed by a finger of the right hand gripping the grip 24, the contact 36 is closed, the photo-motor 38 is driven and photographing is started. Thereafter, when the finger is forced in the downward direction while the operation button 25 is still pressed inward, this force in the downward direction is applied to the lever 26 of the operation button 25, the microswitch 41 is actuated, and the photographing is changed from the wide-angle to the telescopic zoom-up by the zoom motor 43. Alternatively, when the finger is forced in the upward direction while the operation button 25 is still pressed inward, this force in the upward direction is applied to the lever 26 of the operation button 25, the microswitch 42 is actuated and the photographing is changed from the telescopic to wide-angle zoom-down by the zoom motor 43.

When the knob of the variable resistor 45 is slid in the right direction by the left hand which engages the upper portion of the main body 21 under the same state, the resistance value of the variable resistor 45 becomes small and a zooming speed will be quickened. When the knob of the variable resistor 45 is slid in the left direction, a resistance value of the variable resistor 45 becomes large and the zooming speed will be slowed, thereby optionally controlling zooming speed.

According to such construction, not only the photographing operation but also the zoom operation can be carried out by means of only a photo-operation button, so that even if only one hand is used, a zoom effect can positively be used, and even if the zoom effect is suddenly required during photographing, the zoom operation button does not have to be sought as before, and as a result, excellent changeability can be exhibited without any inconvenience. Further, since the zooming speed can be controlled during zooming photographing, it is possible to achieve each kind of variable zooming photo-effects, as compared with the conventional camera in which zooming speed is constant.

Moreover, in this construction, only when the photo operation button is pressed, does the zooming operation become possible; accordingly it is possible to remove the disadvantage of any unnecessary zoom operation and any unnecessary battery consumption even if no photographing is carried out. Also the operation becomes simplified as compared with the conventional one provided with a lock function for every operation button or an ON-OFF switch for the zoom motor circuit interlocked with a photo operation button, a number of parts can be reduced, and excellent reliability can be obtained.

In addition, this invention is not limited to the above embodiment, but may be modified within the range not departing from the essential feature. For instance, in the above embodiment, the operation button 25 is provided in the lengthwise direction, and it can be provided in the widthwise direction as shown in FIG. 6. The above embodiment is explained with reference to the 8 mm camera, but this invention can be applied to 16 mm cameras and video cameras.

Next, a third embodiment of the camera according to the present invention will be described with reference to the FIGS. 7, 8 and 9. In this embodiment, reference numeral 51 is a camera body; in front of this body 1 is provided a lens 52 and in the rear thereof is provided a finder ocular portion 53. The body 1 is further provided with a grip 54 gripped by hand when hand photographing, and near the grip 54 is provided a photo operation button 55 for operating by the hand which grips the grip 54. This operation button 55 when pushed drives a photo motor (not shown).

At the upper portion on the side surface of the camera body 51 is provided a zoom operation lever 56 which operates the electric power zoom function. This zoom operation lever 56 forms an almost T-shaped operation piece 56a at the end portion as shown in FIG. 8. This zoom operation lever 56 is rotatably supported by a shaft 57. The zoom operation lever 56 is regulated in its rotation range by pins 58, 59, and further is biased in the downward direction as illustrated by a spring 60 and stabilized in the neutral unpivoted as illustrated. This spring 60 gives a predetermined restoring force to the operation lever 56.

At the end of the zoom operation lever 56 is formed a recess 56b. Microswitches 61, 62 are provided in opposition to the recess 56b. In this case, the microswitch 61 is actuated when the zoom operation lever 56 rotates in the counterclockwise direction (T direction) and the side periphery of the operation piece 56a presses the switch 61, so that it drives a zoom motor 66 (which will be explained later) from the wide-angle to telescopic zoom-up direction. The microswitch 62 is actuated when the zoom operation lever 56 rotates in th clockwise direction (W direction) and the side periphery of the operation piece 56a presses the switch 62 so that it drives the zoom motor 66 from the telescopic to wide-angle zoom-down direction.

Variable resistors 63, 64 are provided in opposition to both ends of the T-shaped operation piece 56a of the zoom operation lever 56, and slideable pieces 63a, 64a of these variable resistors 63, 64 are secured to ends of the operation piece 56a opposed to each other. Therefore, when the zoom operation lever 56 is rotated in the counterclockwise direction to a zoom speed zone, the variable resistor 63 varies a resistance value in accordance with its amount of rotation, and when the zoom operation lever 56 is rotated in the clockwise direction, the variable resistor 64 varies a resistance value in accordance with its amount of rotation. In this case, the variable resistors 63, 64 reduce the resistance value in accordance with the rotation of the zoom operation lever in the counterclockwise direction or the clockwise direction to the minimum when the stem of lever 56 contacts the pin 58 or 59.

A control circuit of the zone motor is constructed as shown in FIG. 9. That is, numeral 65 is a D.C. supply source; a positive side terminal of this D.C. source 65 is connected to one terminal of the zoom motor 66 through one contact of the zoom microswitch 61 or connected to the other terminal of said motor 66 through one contact of the zoom microswitch 62; the negative side terminal of the D. C. source 65 is connected to the other terminal of said motor 66 through the other contact of the microswitch 61 or connected to one terminal of said motor 66 through the other contact of the microswitch 62 and the above-described variable resistor 64. Accordingly, when the microswitch 61 is actuated, the D.C. source 65 having polarity illustrated is connected to both ends of the motor 66, the zoom-up operation is carried out, and when the microswitch 62 is actuated, the D.C. source 65 has opposite polarity connected to both ends of the motor 66 so as to carry out the zoom-down operation.

In order to use such a camera, the grip 54 is gripped by the right hand, the upper portion of the body 51 is held by the left hand and aimed at an object to be photographed. In this condition, when a finger of the right hand gripping the grip 54 presses the operation button 55, the photo-motor is driven and photographing is started. Thereafter, the zoom operation lever 56 is rotated against deviation or restoration force of the spring 60 in the counterclockwise direction by the finger of the left hand holding the body 51, then the microswitch 61 is operated, and the photographing is zoomed-up from the wide-angle to telescopic view. In this case, if the amount of rotation of the operation lever 56 is large, the resistance value of the variable resistor 63 consequently becomes small and the zoom-up speed is quickened to the maximum. When the amount of rotation of the operation lever 56 is small, the resistance value of the variable resistor 63 becomes large and a zoom-up speed will be slow, thereby controlling the zoom-up speed.

Alternatively, if the zoom operation lever 56 is rotated against the biasing force of the spring 60 in the clockwise direction, the microswitch 62 is actuated and the photographing is zoomed-down from the telescopic to wide-angle view by the zoom motor 66. In this case, if the amount of rotation of the operation lever 56 is also large, the resistance value of the variable resistor 64 consequently becomes small, and the zoom-down speed will be quickened to the maximum, while if the rotation amount of the operation lever 56 is small, the resistance value of the variable resistance 64 becomes large and the zoom-down speed will be slow, thereby optionally controlling the zoom-down speed.

According to such construction, therefore, even in the zooming photographing, the zooming speed can optionally be controlled, so that each kind of zooming photo effects having rich variety can be achieved as compared with photo effects where zooming speed is constant. Further, since the operation lever 56 is operated against the biasing force of the spring 60, the larger the movement of this lever, the larger the restoring force is effected. As a result, in case of optionally setting this restoring force, it becomes possible to make the back zooming speed approximately same as determined by the restoring speed of the operation lever 56 when the operation lever is separated against the zooming speed in accordance with the amount of movement of the operation lever 56, so that a reciprocal speed of the zooming is balanced without eliminating any strange feeling due to different speeds and the zooming effect becomes more stable.

FIGS. 10a and 10b and FIG. 11 show fourth embodiment of this invention. Like parts shown in FIGS. 10a, 10b, 11, 7a and 7b and FIG. 8 are designated by like numbers. In this fourth embodiment, at the upper portion on the side surface of the camera body 51 are provided zoom-up and zoom-down operation levers 67, 68 in parallel to each other. These operation levers 67, 68 are provided with taper portions 67b, 67c, 68b, 68c on both sides of their lower end portions and provided with elongate holes 67a, 68a extended in the axial direction as shown in FIG. 11. Extending transversely through the elongate holes 67a, 68a are pins 69, 70, 77, 78 which extend fixedly from a chassis (not shown), and allow these levers to be linearly moved in the upward and downward direction as illustrated. In this case, the operation levers 67, 68 are constantly biased in the upward direction by springs 71, 72, respectively. These springs 71, 72 have restoring force upon the operation levers 67, 68.

Microswitches 61, 62 are provided adjacent to first taper portions 67b, 68b of the operation levers 67, 68, and are actuated by pressure of the operation lever 67 or 68 on the taper portion 67b or 68b, respectively. The microswitch 61 actuates the zooming motor in the zoom-up direction from a wide angle to telescopic view, while the microswitch 62 actuates the zoom motor in the zoom-down direction from a telescopic to wide-angle view.

Variable resistors 63, 64 are provided in opposition to the lower ends of the operation levers 67, 68, respectively. These variable resistors 63, 64 are secured to the operation levers 67, 68 corresponding to their slidable members 63a, 64a so as to vary the resistance value by movement of the levers. In this case, the variable resistors 63, 64 can make the resistance value small in accordance with the amount of movement of the operation levers 67, 68.

A lock member 73 is provided between the other or inner taper portions 67c, 68c of the operation levers 67, 68. This lock member 73 is provided with an elongate hole 74 and into this elongate hole 74 extend pins 75, 76 which extend fixedly from a chassis (not shown) so as to allow member 73 to move linearly at a right angle to the direction of movement of said operation levers 67, 68. For example, when the operation lever 67 is pressed downward, the lock member 73 is pressed by the taper portion 67c and moved to the right into contact with the operation lever 68 as illustrated, so as to prevent the operation lever 68 from being depressed in this state. It is a matter of course that when the operation lever 68 is previously depressed, its taper portion 68c drives member 73 in the left direction as illustrated, which then prevents the depression of the operation lever 67.

In this case, if the operation lever 67 is depressed, the lock member 73 is pressed by the taper portion 67c and moved in the right direction as illustrated. Therefore, under this state, depression of the operation lever 68 is prevented by the lock member 73, thereby preventing simultaneous movement of the microswitches 61, 62 and also preventing a short-circuit of a power source circuit. On the other hand, when the operation lever 68 is depressed, its taper portion 68c moves the lock member 73 in the left direction as illustrated, depression of the operation lever 67 is prevented and the simultaneous movement of the microswitches 61, 62 is also prevented and a short-circuit of the power source circuit is prevented.

The simultaneous operation of the zoom-up and zoom-down operation levers is positively prevented, so that a major accident such as short-circuit of the power supply circuit or the like can be prevented before occurring and the stable photo-operation can be carried out.

In a camera having such construction one can carry out the zoom-up or zoom-down operation by depressing the operation lever 67 or 68 and optionally controlling the zooming speed in accordance with the amount of displacement of the operation levers 67, 68; one can make the back zooming speed approximately same as the zooming speed in accordance with the amount of displacement of the operation levers 67, 68 by means of springs 71, 72. The same effect as described in the foregoing can be expected.

In addition, this invention is not limited to the above embodiments but can be modified without departing from the invention as defined in the claims. For instance, in the above embodiment, the larger the displacement of the operation lever, the quicker the zooming speed, but this relation is reversible.

As described above, according to the present invention, with the addition of the zoom operation function to the photo-operation button, both the photo-operation and the zoom operation are simultaneously carried out by a single hand, with excellent maneuverability, and both the zoom operation and the control of the zooming speed are simultaneously possible.

The zoom operation lever is provided with a function for controlling the zooming speed, thereby controlling the zooming speed during zooming photographing, making the back zooming speed at the time of restoring the operation lever approximately same as the zooming speed in accordance with the amount of displacement of the operation lever, and stabilizing the zooming effect.

The unnecessary zooming operation can be avoided and the unnecessary consumption of a battery can be avoided, and the simple operation and excellent reliability can be obtained by adding the zoom operation function to the photo operation button so as to make the zooming operation possible on the precondition of the photo operation by means of the photo operation button in this overall camera and zoom control means.

What is claimed is:

1. A camera having a zoom function comprising a camera body, a lens system provided in front of the body, a finder ocular member provided at the rear of the body, a grip provided under the body for supporting the body by the hand of a person using the camera, a photo-operation button provided near the grip and operable by said hand to take a photograph, a photography operation member movable a first displacement in the linear direction for operating the camera to take photos, and further movable a second displacement in the direction approximately at a right angle to the first displacement for zoom-up or zoom-down operation, said second displacement possible only after said first displacement, and a zoom-operation member for variably operating the speed of the zoom-up or zoom-down operation in response to the amount of displacement of said zoom-operation member.

2. A camera as claimed in claim 1, wherein said zoom operation function is added to the photography operation member so as to effect zooming operation on the pre-condition of said first displacement by the photography operation member.

3. A camera as claimed in claim 1, wherein a zoom operation lever for affecting zoom-up or zoom-down further comprises means for varying the zooming speed in accordance with an amount of displacement of the zoom operation lever.

4. A camera as claimed in claim 3, wherein the camera further comprises means for making the zooming speed at the time of restoring the zoom operation lever approximately same as the zooming speed corresponding to the amount of displacement of the zoom operation lever.

5. A camera as claimed in claim 3, further comprising two zoom operation levers for effecting zoom-up and zoom-down respectively, said zooming speeds being varied in accordance with the amounts of displacement of these operation levers, and lock means which prevents the operation of one lever during the operation of the other lever.

6. In a camera which includes a zoom-lens system which may be zoomed-up or zoomed down, a camera body, first circuit means including a camera switch for operating said camera to take photos, second circuit means for operating said zoom-lens system to zoom-up or zoom-down, and control means including a photo-operation member on said camera body and movable from an OFF position where the camera and the zoom-lens system do not operate to an ON position, thereby actuating said camera switch and said first circuit means for said camera to take photos, the improvement wherein: said photo-operation member is further movable to first or second zoom positions, said control means further comprises first and second zoom switches each coupled with said second circuit means for actuating said zoom-lens system to zoom-up or zoom-down respectively, and said photo-operation member, when moved to said first or second zoom position (a) actuating said camera switch for operating said camera to take photos and (b) actuating only one of said first or second zoom switches for operating said zoom-lens system to zoom-up or zoom-down respectively.

7. A camera according to claim 6 wherein said photo-operation member further comprises an operation lever part which engages and actuates said camera switch and said zoom switches, said photo-operation member being displaceable linearly between its OFF and ON positions and being further displaceable in a first direction transverse of said linear displacement for actuating said first zoom switch and further displaceable from said ON position in a second different direction also transverse of said linear displacement for actuating said second zoom switch, and thereby affecting zoom-up and zoom-down operations respectively.

8. A camera according to claim 7 wherein said operation lever is pivotable in clockwise or counterclockwise directions respectively when displaced from said ON position to each of said first and second zoom positions.

9. A camera according to claim 6 wherein said control mean further comprises speed control means for varying the speed of zooming-up and zooming-down, said photo-operation member further comprises an operation lever which engages and actuates said camera switch, zoom switches, and speed control means, and said photo-operation member is further displaceable from said first zoom position to a zoom-up speed zone, whereby, upon displacement of said photo-operation member from said first zoom position to said zoom-up speed zone, zoom-up continues and the zoom speed is varied proportionately with the amount of displacement of said member in said zoom-up speed zone, and upon further displacement of said member from said second zoom position to said zoom-down speed zone, zoom speed varies similarly as in said zoom-up speed zone.

10. A camera according to claim 9 wherein said speed control means further comprises a variable resistor in series in said second circuit means, and said operation lever is coupled to said variable resistor to reduce the resistance thereof proportionately with the amount of displacement of said lever, whreby greater displacement of said photo-operation member from either of said first and second zoom positions into a corresponding first or second zoom speed zone reduces the electrical resistance of said variable resistor and increases said zoom speed.

11. In a camera which includes a zoom-lens system which may be zoomed-up or zoomed down, a camera body, first circuit means for operating said camera to take photos, second circuit means for operating said zoom-lens system, and control means including a photo-operation member on said camera body and movable between an OFF position where said camera does not operate and an ON position thereby actuating said first circuit means for operating said camera to take photos, the improvement wherein said control means further comprises speed control means for varying the speed of zoom-up and zoom-down, and a zoom-operation lever which is coupled to said second circuit means and said speed control means and is movable between (a) an OFF position where said second circuit means and zoom-lens system are not activated, (b) a first position where said zoom-lens system is activated to zoom-up at a predetermined rate of speed, (c) a first speed zone position where said zone-up continues and said speed of zoom-up varies proportionately with the amount of displacement of said zoom-operation lever in said first speed zone, (d) a second zoom position where said zoom-lens system is activated to zoom-down at a predetermined rate of speed, and (e) a second speed zone position where said zoom-down continues and said speed of zoom-down varies proportionately with the amount of displacement of said zoom-operation lever in said second speed zone.

12. A camera according to claim 11 wherein said speed control means further comprises a variable resistor in series in said second circuit means, and said zoom-operation lever is coupled to said variable resistor to reduce resistance thereof proportionately with the amount of displacement of said lever, whereby greater displacement of said zoom-operation lever in either of said first and second zoom speed zones increases the zoom speed thereof.

13. In a camera which includes a zoom-lens system which may be zoomed-up or zoomed-down, a camera body, first circuit means for operating said camera to take photos, second circuit means for operating said zoom-lens system, and control means including a photo-operation member on said camera body and movable between an OFF position where said camera does not operate and an ON position thereby actuating said first circuit means for operating said camera to take photos, the improvement wherein said control means further comprises first and second zoom-operation levers on said camera body for controlling zoom-up and zoom-down respectively, and speed control means for varying the speed of said zoom-up and zoom-down, said first lever coupled to said second circuit means and displaceable from an OFF position where said second circuit means and zoom-lens systems are not activated, to a first zoom position where said zoom-lens system is activated to zoom-up at a predetermined rate, and further displaceable to a variable zoom speed zone position where said zoom-up continues and said speed of zoom-up varies proportionately with the amount of displacement of said first lever in said speed zone position, said second zoom-operation lever being coupled with said second circuit means and said speed control means and displaceable similarly as said first lever between second OFF, zoom and variable zoom speed zone positions for similarly controlling and varying the zoom-down speed, said control means further comprising lock means for preventing either of said zoom-operation levers from activating said zoom-lens system and speed control means while the other zoom-operation lever has activated said zoom-lens system.

* * * * *